United States Patent [19]

Kato et al.

[11] Patent Number: 5,093,172

[45] Date of Patent: Mar. 3, 1992

[54] MAGNETIC RECORDING MEDIUM COMPRISING A VINYL CHLORIDE COPOLYMER CONTAINING A POLAR GROUP AND A POLYURETHANE CONTAINING A POLAR GROUP AND SPECIFIED AROMATIC OR ALICYCLIC UNITS

[75] Inventors: Mikihiko Kato; Yasushi Endo; Yasuo Nagashima; Hiroshi Hashimoto, all of Kanagawa, Japan

[73] Assignee: Fuji Photo Film Co., Ltd., Kanagawa, Japan

[21] Appl. No.: 543,911

[22] Filed: Jun. 26, 1990

[30] Foreign Application Priority Data

Jun. 26, 1989 [JP] Japan ................................. 1-163395
Dec. 26, 1989 [JP] Japan ................................. 1-337687

[51] Int. Cl.$^5$ ............................................. G11B 5/00
[52] U.S. Cl. ........................................ 428/64; 428/65; 428/694; 428/900; 428/424.6; 428/425.9
[58] Field of Search ................... 428/694, 900, 424.6, 428/425.8, 425.9, 64, 65

[56] References Cited

U.S. PATENT DOCUMENTS 4,885,208 12/1989 Araki et al. .......................... 428/403

Primary Examiner—Merrell C. Cashion, Jr.
Assistant Examiner—Stevan A. Resan
Attorney, Agent, or Firm—Sughrue, Mion, Zinn, Macpeak & Seas

[57] ABSTRACT

A magnetic recording medium is disclosed, comprising a nonmagnetic support having thereon a magnetic layer comprising ferromagnetic metal particles and binder resins, in which 35 to 55% by weight of said binder resins are a polar group-containing vinyl chloride copolymer and 10 to 25% by weight of said binder resins are a polyurethane resin obtained by the reaction of a polyisocyanate with a polyester polyol that is a product of the reaction of at least one of an alicyclic dihydric alcohol and an aromatic dihydric alcohol with at least one of an alicyclic dicarboxylic acid and an aromatic dicarboxylic acid, said polyurethane resin containing a polar group selected from the group consisting of —$SO_3M$, —COOM, —$PO_3M$ wherein M is an H, Na, or K atom, and —$NH_2$ in an amount of from 0.03 to 2% by weight, the amount of said binder resin in the magnetic layer being from 15 to 30 parts by weight per 100 parts by weight of said ferromagnetic metal particles.

10 Claims, No Drawings

MAGNETIC RECORDING MEDIUM COMPRISING A VINYL CHLORIDE COPOLYMER CONTAINING A POLAR GROUP AND A POLYURETHANE CONTAINING A POLAR GROUP AND SPECIFIED AROMATIC OR ALICYCLIC UNITS

FIELD OF THE INVENTION

The present invention relates to a magnetic recording medium. More particularly, it relates to a magnetic coating type recording medium employing ferromagnetic metal particles and having excellent running durability.

BACKGROUND OF THE INVENTION

In the field of magnetic recording media having a magnetic layer consisting mainly of ferromagnetic particles and binder resins, there is a growing demand for such media capable of higher-density recording. Smoothing the surfaces of the magnetic layers is one of the known measures to cope with such demand.

However, enhanced surface smoothness of the magnetic layer causes the coefficient of friction between the magnetic layer of the magnetic recording medium during running and the recording or reproducing device's parts in contact with the magnetic layer to be so heightened that the magnetic layer has been apt to suffer damage or to peel off in a relatively short period of use.

The magnetic layers of floppy disks, in particular, are often exposed to severe atmospheres as in durability tests. In the case where floppy disks are used under such conditions, the magnetic layers are occasionally apt to shed ferromagnetic particles, which can cause clogging of magnetic heads.

Further, as an effective means for obtaining magnetic recording media that can record information at high densities, ferromagnetic metal particles have come into use as ferromagnetic particles. The use of ferromagnetic metal particles in a floppy disk, however, has been disadvantageous in that due to the rubbing contact of the magnetic layer with the nonwoven fabric (liner) attached to the inside of the floppy disk jacket or the inside of the cartridge, the magnetic layer is prone to suffer damage in short periods of time, in turn potentially causing dropouts. This problem, which did not occur with conventional floppy disks in which the ferromagnetic particles were iron oxide particles, has often been encountered, particularly when the floppy disks are used under environmental conditions of relatively high temperatures such as 50° to 60° C.

For improving the running durability of magnetic layers, it has been proposed to incorporate an abrasive agent (hard particles), such as corundum, silicon carbide, or chromium oxide, in magnetic layers. However, this technique is disadvantageous in that in order to fully produce the effect of improving the running durability of magnetic layers, the abrasive agents should be incorporated into the magnetic layers in considerably large amounts.

Further, the incorporation of an abrasive agent has been found insufficient for protecting the magnetic layer from being damaged by the liner.

In addition, the magnetic layers containing large proportions of abrasive agents cause excessive magnetic head wear, etc. Furthermore, the incorporation of abrasive agents has been undesirable in that it is contrary to the approach of improving electromagnetic characteristics by smoothing magnetic layers.

It has also been proposed to incorporate in magnetic layers a fatty acid or an ester of a fatty acid with an aliphatic alcohol, as a lubricant, so as to minimize coefficient of friction. For example, U.S. Pat. No. 3,833,412 proposes to incorporate a monobasic fatty acid having 4 or more carbon atoms, such as caprylic acid, lauric acid, or oleic acid, as a lubricant; U.S. Pat. No. 3,274,111 proposes to incorporate as a lubricant a fatty acid ester which is an ester of a monobasic fatty acid having 12 to 16 carbon atoms with an aliphatic alcohol having 3 to 12 carbon atoms, examples of such ester including butyl laurylate, lauryl palmitate, and butyl myristate; and U.S. Pat. No. 4,303,738 proposes to incorporate tridecyl stearate as a lubricant.

JP-A-55-157131 proposes to incorporate as a lubricant an ester of a higher fatty acid with a branched higher alcohol, and also JP-A-59-186130 proposes to incorporate isocetyl stearate as a lubricant. (The term "JP-A" as used herein means an "unexamined published Japanese patent application".)

However, the incorporation of such lubricants adversely affects the strength of the magnetic layers, although effective in lowering the coefficient of friction. Thus, the incorporation of lubricants has been found insufficient for preventing damage of the magnetic layer caused by contact with the liner.

Moreover, use of cellulosic resins, as binder resins, having high modulus of elasticity and excellent mechanical strength, so as to improve the mechanical strength of magnetic layers is disclosed in, for example, JP-A-56-13519, JP-A-62-239316, JP-A-58-70424, JP-A-58-70425, JP-A-56-74833, JP-A-60-133527, JP-A-62-34326, JP-A-62-26628, JP-A-59-79428, JP-A-57-135439, JP-A-56-74832, and JP-A-59-188827.

Binder resins based on such conventional cellulosic resins including nitrocellulose, however, are insufficient in the ability to disperse ferromagnetic particles, so that not only do the resulting magnetic layers not have good surface quality, but the packing density of ferromagnetic particles cannot be sufficiently increased. Consequently, the use of conventional cellulosic resins has been ineffective in providing magnetic recording media having excellent electromagnetic characteristics.

As another method for obtaining mechanically tough magnetic layers, use of a polyurethane resin, as a binder resin, obtained from a polyester polyol synthesized from an alicyclic or aromatic dihydric alcohol and an alicyclic or aromatic dicarboxylic acid is disclosed in, for example, JP-A-62-246310 and JP-B-58-8053; and, incorporation of such polyurethane resin is advantageous in heightening modulus of elasticity and mechanical strength. (The term "JP-B" as used herein means an "examined Japanese patent publication".)

However, binder resins employing the above polyurethane resin have been insufficient in their ability to disperse ferromagnetic metal particles and also in preventing the resulting magnetic layers from damage caused by contact with liners.

SUMMARY OF THE INVENTION

The present invention has been completed in view of the drawbacks accompanying the conventional techniques described above.

It is, therefore, an object of the present invention to provide a magnetic recording medium employing ferromagnetic metal particles, in which the medium has such good running durability that the magnetic layer is not damaged by rubbing contact with the liners in floppy disk jackets or cartridges and which also has excellent electromagnetic characteristics.

The above object of the present invention is accomplished with a magnetic recording medium comprising a nonmagnetic support having thereon a magnetic layer comprising ferromagnetic metal particles and binder resins, in which 35 to 55% by weight of the binder resins are a polar group-containing vinyl chloride copolymer and 10 to 25% by weight of the binder resins are a polyurethane resin obtained by the reaction of a polyisocyanate with a polyester polyol that is a product of the reaction of at least one of an alicyclic dihydric alcohol and an aromatic dihydric alcohol with at least one of an alicyclic dicarboxylic acid and an aromatic dicarboxylic acid, the polyurethane resin containing a polar group selected from the group consisting of $-SO_3M$, $-COOM$, $-PO_3M$ (wherein M is an H, Na, or K atom), and $-NH_2$ in an amount of from 0.03 to 2% by weight, the amount of the binder resin in the magnetic layer being from 15 to 30 parts by weight per 100 parts by weight of the ferromagnetic metal particles.

DETAILED DESCRIPTION OF THE INVENTION

The magnetic recording medium of the present invention has the following advantages. Since the magnetic layer employs ferromagnetic metal particles, the magnetic recording medium is advantageous in its ability for high-density recording. The magnetic layer of the magnetic recording medium exhibits excellent running durability because it employs a binder resin comprising specific proportions of a vinyl chloride copolymer and a polyurethane resin whose polymer backbone is a polyester polyol that is a product of the reaction of an alicyclic dihydric alcohol and/or an aromatic dihydric alcohol with an alicyclic dicarboxylic acid and/or an aromatic dicarboxylic acid, such binder resin being able to impart excellent mechanical strength to the magnetic coating. Furthermore, since both the polyurethane resin and the vinyl chloride copolymer contain a polar group, the ferromagnetic metal particles in the magnetic layer are present in a well dispersed state, so that the magnetic layer has good surface smoothness; hence, the magnetic recording medium of the present invention shows excellent electromagnetic characteristics with high sensitivity and a lowered noise level.

The alcohol ingredient used to synthesize the polyester polyol to be the backbone of the urethane resin employed in the binder resin of the magnetic layer in the present invention is an alicyclic dihydric alcohol and/or an aromatic dihydric alcohol. Examples of such alcohols include 2,5-dihydroxyhexene-3-cyclohexane-1,2-diol, cyclohexane-1,3-diol, cyclohexane-1,4-diol, cyclohexane-1,4-dimethanol, cyclohexane-1,3-dimethanol, 1,4-di(hydroxyethoxy)cyclohexane, 2,2-bis(4-hydroxycyclohexyl)propane, bis(4-hydroxycyclohexyl)methane, 2,2-bis(4-hydroxyethoxycyclohexyl)propane, 2,2-bis(4-hydroxyethoxyphenyl)propane, 2,2-bis(4-hydroxyethoxyethoxyphenyl)propane, 2,2-bis(4-hydroxyethoxyphenyl)-methane, and 2,2-bis(4-hydroxyethoxyethoxyphenyl)methane. Preferred of these are cyclohexane-1,4-diol, cyclohexane-1,4-dimethanol, and 2,2-bis(4-hydroxyethoxyphenyl)propane.

On the other hand, the acid ingredient used to synthesize the polyester polyol for use in forming the polyurethane resin is an alicyclic dicarboxylic acid and/or an aromatic dicarboxylic acid. Examples of such acids include hexahydrophthalic acid, tetrahydrophthalic acid, 1-carboxylato-7-methylenecarboxylatonorbornane, 2,6-dicarboxylato-1,4H-naphthalene, phthalic acid, isophthalic acid, terephthalic acid, naphthalenedicarboxylic acid, bismethylenecarboxylatobenzene, p,p'-biphenyl dicarboxylate, 2,2'-bis(4-carboxyphenyl)propane, 3,6-endomethylene-1,2,3,6-tetrahydrophthalic acid, and HET acid. Preferred of these are hexahydrophthalic acid, tetrahydrophthalic acid, phthalic acid, isophthalic acid, and terephthalic acid.

It is preferred that the above-described alicyclic and/or aromatic dihydric alcohol comprise 50 mol % or more, particularly 70 mol % or more, of all of the alcohol ingredient(s) used to synthesize the polyester polyol for use in forming the polyurethane resin employed in the present invention, and/or the above-described alicyclic and/or aromatic dicarboxylic acid comprise 50 mol % or more, particularly 70 mol % or more, of all of the acid ingredient(s) used to synthesize the polyester polyol. If the amount of such specific acid ingredient and/or alcohol ingredient is less than 50 mol %, the resulting binder resin has enhanced stickiness, unfavorably resulting in increased coefficient of friction and poor running durability. Further, output also tends to be impaired. As part of the dihydric alcohol(s), aliphatic dihydric alcohols such as those shown below may be used in an amount less than 50 mol %:

Ethylene glycol, trimethylene glycol, tetramethylene glycol, pentamethylene glycol, hexamethylene glycol, heptamethylene glycol, octamethylene glycol, nonamethylene glycol, decamethylene glycol, diethylene glycol, triethylene glycol, tetraethylene glycol, 2,2-dimethylpropane-1,3-diol, 2,2-diethylpropane-1,3-diol, 2-n-butyl-2-ethylpropane-1,3-diol, propane-1,2-diol, butane-2,3-diol, 2-ethylbutane-1,4-diol, 2-methylpentane-2,4-diol, 3-methylpentane-2,4-diol, and 2,2,4-trimethylpentane-1,3-diol.

As part of the dibasic acid(s), compounds such as those shown below may be used in an amount less than 50 mol %:

Oxalic acid, malonic acid, succinic acid, glutaric acid, adipic acid, sebacic acid, azelaic acid, dodecanoic acid, maleic acid, fumaric acid, itaconic acid, trimethyladipic acid, methyleneglutaric acid, ethylmalonic acid, methylmaleic acid, and methylfumaric acid.

In addition to the above, an alcohol having three or more hydroxyl groups and an acid with a basicity of three or more may be used in an amount not exceeding 5 mol %.

Examples of the isocyanate ingredient used to form the polyurethane resin employed in the present invention include tolylene diisocyanate, diphenylmethane-4,4'-di-isocyanate, isophorone diisocyanate, dicyclohexylmethane-4,4'-diisocyanate, and p-phenylene diisocyanate.

The amount of the isocyanate ingredient reacted with the polyester polyol is generally 5 mol % or more, preferably 10 mol % or more, based on the total amount of all the alcohol units and all the acid units constituting the polyester polyol.

The above-described polyurethane resin employed in the magnetic layer in the magnetic recording medium of the present invention contains a polar group selected from the group consisting of $-SO_3M$, $-CO_2M$, $-PO_3M$ (wherein M represents an H, Na, or K atom), and $-NH_2$. Preferred of these polar groups are $-SO_3Na$, $SO_3K$, and $-CO_2H$. For incorporating such polar group, there may be employed (1) a method in which such polar group is introduced beforehand into the alcohol or acid ingredient to be used as a raw material for producing the polyester polyol for use in forming the polyurethane resin employed in the present invention (for example, a tribasic acid, such as trimellitic acid, pyromellitic acid, or methylcyclohexenetricarboxylic acid, or a dibasic acid having a sulfonic acid metal salt moiety, such as 5-sodium sulfoisophthalic acid or 2-sodium sulfoterephthalic acid, is used as part of the acid ingredient), (2) a method in which a product of the reaction of a hydroxyl compound containing such polar group with a diisocyanate compound is reacted with active hydrogen in the polyurethane resin described above, or other methods which will be apparent.

The content of the above polar group in the polyurethane resin is from 0.03 to 2% by weight, preferably from 0.05 to 1.5% by weight, more preferably from 0.08 to 1.2% by weight based on the polyurethane resin. If the content thereof is outside the above range, the binder resin is impaired in the ability to disperse ferromagnetic metal particles. The number-average molecular weight of the polyurethane resin may generally be from 20,000 to 200,000, preferably from 30,000 to 150,000, more preferably from 40,000 to 100,000. If the molecular weight is below the noted lower limit, the resulting magnetic layer has poor durability, while if it is too high, use of such a polyurethane resin results in a magnetic coating composition which is so high in viscosity as to be poor in dispersing ability.

The polar group-containing vinyl chloride copolymer to be employed in the binder resin for the magnetic layer in the magnetic recording medium of the present invention can be one produced by incorporating a polar group such as $-SO_3M$, $-OSO_3M$, $-COOM$, $-PO_3M$, or $-PO(OM)_2$ (wherein M is an H, Na, or K atom) into a copolymer of vinyl chloride and other monomer(s) polymerizable with vinyl chloride. Examples of such other monomer(s) include vinyl acetate, vinylidene chloride, acrylonitrile, styrene, and acrylic esters.

Of the above polar groups, $-SO_3M$ is preferred from the standpoint of enhancing the dispersion of ferromagnetic metal particles.

The amount of the polar group incorporated in the vinyl chloride copolymer is generally from 0.01 to 5.0 mol %, preferably from 0.5 to 3.0 mol % based on the copolymer.

The stability of the above-described vinyl chloride copolymer can be heightened by incorporating therein an epoxy group in an amount of generally from 1.0 to 30 mol %, preferably from 2.0 to 10 mol % based on the copolymer.

It is preferable that the number-average molecular weight of the vinyl chloride copolymer be from 15,000 to 60,000, particularly from 20,000 to 40,000.

The amount of the vinyl chloride copolymer contained in the binder resin employed in the magnetic layer of the magnetic recording medium of the present invention is from 35 to 55% by weight, preferably from 40 to 55% by weight, particularly preferably from 40 to 50% by weight based on the total amount of the binder resin.

If the vinyl chloride copolymer content in the binder resin is too low, the mechanical strength (elasticity modulus) of the resulting magnetic layer is disadvantageously decreased, while too high a content thereof is also not preferable in that the resulting magnetic layer has too high an elasticity modulus and is too brittle.

The amount of the above-described polyurethane resin contained in the binder resin employed in the magnetic layer of the magnetic recording medium of the present invention is from 10 to 25% by weight, preferably from 15 to 20% by weight, based on the amount of the binder resin.

If the polyurethane resin content in the binder resin is too low, the mechanical strength, particularly the breaking energy, of the resulting magnetic layer is decreased, while too high a content thereof is also not preferable in that the resulting magnetic layer has a lowered elasticity modulus and, hence, shows decreased mechanical strength and increased coefficient of friction.

Various polyisocyanates may be used as the binder resin component along with the binder resin to be employed in the magnetic recording medium of the present invention.

Examples of the polyisocyanate that can be used for forming the magnetic layer of the magnetic recording medium of the present invention include isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate; products of the reactions of these isocyanates with polyhydric alcohols; and polyisocyanates formed through condensation of isocyanates. Such polyisocyanates are commercially available under the trade names of: Coronate L, Coronate HL, Coronate 2030, Coronate 2031, Millionate MR, and Millionate MTL (manufactured by Nippon Polyurethane Industry Co., Ltd., Japan); Takenate D-102, Takenate D-110N, Takenate D-200, and Takenate D-202 (manufactured by Takeda Chemical Industries, Ltd., Japan); and Desmodule L, Desmodule IL, Desmodule N, and Desmodule HL (manufactured by Sumitomo Bayer Co., Ltd., Japan). These may be used alone, or used in combination of two or more thereof, taking advantage of differences in hardening reactivity. For the purpose of accelerating the hardening reaction, the polyisocyanate may be used in combination with a compound having a hydroxyl group or an amino group. This hydroxyl or amino group-containing compound desirably is polyfunctional.

In the magnetic recording medium of the present invention, the amount of the above-described binder resin contained in the magnetic layer is from 15 to 30 parts by weight, preferably from 20 to 30 parts by weight, per 100 parts by weight of the ferromagnetic metal particles in the magnetic layer.

If the amount of the binder resin contained in the magnetic layer is too small, the resulting magnetic layer has a lowered hardness and is hence apt to be damaged by liners. If the amount thereof is too large, the magnetic layer becomes so brittle that it is prone to suffer abrasion and thus shows poor running durability.

The ferromagnetic metal particles employed in the magnetic recording medium of the present invention contain at least Fe. Specifically, the ferromagnetic metal particles may be particles of elemental metals or an alloy and consist mainly of Fe, Fe-Co, Fe-Ni, Fe-Co-Ni, or the like. For improving the properties of the ferromagnetic metal particles, a metal or non-metal such as B, C, Al, Si, P, etc. may be added to those components. Normally, the surfaces of the ferromagnetic metal particles have been covered with a layer of oxide in order to improve the stability of the particles. Preferably, the ferromagnetic metal particles have a specific surface area (according to the BET method; $S_{BET}$) of 40 m$^2$/g or more and a crystallite size of 400 Å or less. It is also preferable that the acicular ratio (long axis/short axis) be 5 or more, the saturation magnetization be 110 emu/g or more (more preferably 120 emu/g or more), and the coercive force be 800 Oe or more (more preferably 1200 Oe or more).

In the magnetic layer of the magnetic recording medium of the present invention, a lubricant, carbon black, and an abrasive agent are normally incorporated along with the ferromagnetic metal particles and binder resin described above. In addition to these, an antistatic agent, a dispersant, and other additives may be added if required.

Examples of lubricants that can be incorporated in the magnetic layer of the magnetic recording medium of the present invention include silicone oil, graphite, molybdenum disulfide, boron nitride, graphite fluoride, fluorine-containing alcohols, polyolefins (e.g., polyethylene wax), polyglycols (e.g., poly(ethylene oxide) wax), alkyl phosphates, polyphenyl ethers, tungsten disulfide, an ester of a monobasic fatty acid having 10 to 20 carbon atoms and at least one monohydric alcohol having 3 to 12 carbon atoms or di-, tri-, tetra- or hexahydric alcohols having 3 to 12 carbon atoms, and an ester of a monobasic fatty acid having 10 or more carbon atoms with a mono- to hexahydric alcohol having carbon atoms in such a number that the sum of the carbon atoms in the alcohol and those in the acid is between 11 and 28. Further, fatty acids, fatty acid amides, and aliphatic alcohols each having 8 to 22 carbon atoms may be used as lubricant. Specific examples of these organic compound lubricants include butyl caprylate, octyl caprylate, ethyl laurate, butyl laurate, octyl laurate, ethyl myristate, butyl myristate, octyl myristate, ethyl palmitate, butyl palmitate, octyl palmitate, ethyl stearate, butyl stearate, octyl stearate, amyl stearate, anhydrosorbitan monostearate, anhydrosorbitan distearate, anhydrosorbitan tristearate, anhydrosorbitan tetrastearate, oleyl oleate, oleyl alcohol, and lauryl alcohol. Furthermore, so-called lubricating oil additives may also be used alone as the lubricant for use in the present invention. Examples of such lubricating oil additives include antioxidants (e.g., alkylphenols), rust preventives (e.g., naphthenic acid, alkenylsuccinic acids, and dilauryl phosphate), oiliness improvers (e.g., colza oil and lauryl alcohol), extreme pressure additives (e.g., dibenzyl sulfide, tricresyl phosphate, and tributyl phosphite), detergent-dispersing agents, viscosity-index improvers, pour-point dispersing agents, and anti-foaming agents. These lubricants may be incorporated in an amount of from 0.05 to 20 parts by weight per 100 parts by weight of the binder.

Examples of dispersing agents that can be incorporated in the magnetic layer of the magnetic recording medium of the present invention include fatty acids having 10 to 22 carbon atoms (R$^1$COOH, wherein R$^1$ is an alkyl group having 9 to 21 carbon atoms) such as caprylic acid, capric acid, lauric acid, myristic acid, palmitic acid, stearic acid, oleic acid, elaidic acid, linoleic acid, linolenic acid, and stearolic acid; metallic soaps obtained from the above-mentioned fatty acids and metals such as alkali metals (e.g., Li, Na, and K), alkaline earth metals (e.g., Mg, Ca, and Ba), Cu, and Pb; and lecithin. In addition to these, examples of dispersing agents further include higher alcohols having 4 carbon atoms or more (butanol, octyl alcohol, myristyl alcohol, stearyl alcohol) and sulfates and phosphates of such alcohols. These dispersing agents may be incorporated in an amount of from 0.005 to 20 parts by weight per 100 parts by weight of the binder. The method for using such dispersing agents is not particularly limited. For example, the dispersing agents may be allowed to adhere to the surfaces of the ferromagnetic fine particles or nonmagnetic fine particles beforehand, or may be added when these particles are being dispersed.

Examples of antistatic agents that can be used in the magnetic layer of the magnetic recording medium of the present invention include electrically conductive powders such as graphite powder, carbon black, and carbon black graft polymer powder; natural surfactants such as saponin; nonionic surfactants such as ones of the alkylene oxide type, the glycerin type, or the glycidol type, polyhydric alcohols, esters of polyhydric alcohols, and adducts of alkylphenolethylene oxide; cationic surfactants such as (higher alkyl)-amines, cyclic amines, hydantoin derivatives, amidoamines, ester-amides, quaternary ammonium salts, heterocyclic compounds including pyridine, and phosphonium or sulfonium compounds; anionic surfactants containing an acid radical such as a carboxylic, sulfonic, or phosphoric acid radical or a sulfuric or phosphoric ester radical; amino acids; and ampholytic surfactants such as aminosulfonic acids, esters of sulfuric or phosphoric acid and aminoalcohols, and alkyl-betaine-type surfactants.

Examples of carbon black which can be employed in the magnetic layer of the magnetic recording medium of the present invention include furnace black for rubbers, thermal black for rubbers, coloring black, and acetylene black. These carbon blacks are known in the United States under, for example, the following abbreviations: SAF, ISAF, IISAF, T, HAF, SPF, FF, FEF, HMF, GPF, APF, SRF, MPF, ECF, SCF, CF, FT, MT, HCC, HCF, MCF, LFF and RCF. Carbon blacks which fall under ASTM D-1765-82a may be used. The carbon black which may be employed in the present invention has an average particle size of from 5 to 1,000 mμ (electron microscope), a specific surface area as measured by the nitrogen adsorption method of from 1 to 800 m$^2$/g, a pH of from 4 to 11 (JIS K-6221, 1982), and an oil absorption as measured with dibutyl phthalate (DBP) of from 10 to 800 ml/100 g (JIS K-6221, 1982). According to the present invention, carbon black having particle sizes of from 5 to 100 mμ may be used for reducing the surface electric resistance of a coated film, and carbon black of from 50 to 1,000 mμ may be used for controlling the strength of a coated film. Further, fine carbon black (100 mμ or less) may be used for controlling the surface roughness of a coated film so as to smooth the surface and reduce the spacing loss, while coarse carbon black (50 mμ or more) may be used in combination with other type(s) of carbon black for effectively roughening the surface of a coated film so as to decrease its friction coefficient.

As the abrasive agent which can be employed in the magnetic layer of the magnetic recording medium of the present invention, generally used abrasive materials having an abrading or polishing effect may be used. Examples of the abrasive material include α-alumina, molten alumina, silicon carbide, chromium oxide, cerium oxide, corundum, artificial diamond, α-iron oxide, garnets, emery (main ingredients: corundum and magnetite), silica, silicon nitride, boron nitride, molybdenum carbide, boron carbide, tungsten carbide, titanium carbide, tripoli, diatom earth, and dolomite. These abrasive materials, which mostly have Mohs' hardnesses of 6 or more, may be used alone, or two to four thereof may be used in combination. The average particle size of the abrasive material is generally from 0.005 to 5 $\mu$m, preferably from 0.05 to 2 $\mu$m. The amount of the abrasive agent incorporated in the magnetic layer is generally in the range of from 0.01 to 20 parts by weight per 100 parts by weight of the binder.

The nonmagnetic support employed in the present invention is not particularly limited, and generally used nonmagnetic supports can be employed in the present invention. Examples of the material of the nonmagnetic support include films of various synthetic resins such as poly(ethylene terephthalate), polyethylene, polypropyrene, polycarbonates, poly(ethylene naphthalate), polyamides, poly(amido-imide)s, polyimides, polysulfones, and polyethersulfons and metal foils such as aluminum foil and stainless-steel foil.

For forming a magnetic layer containing the ferromagnetic metal particles, the binder resin, and other components, for example, including carbon black and the above-described ester compound on a nonmagnetic support, an organic solvent is added to these ingredients and the resulting mixture is kneaded to disperse or dissolve the ingredients to prepare a magnetic coating composition, which is then applied on a nonmagnetic support and dried to form a magnetic layer.

Examples of the organic solvent for use in the preparation of the magnetic coating composition include ketone-type compounds such as acetone, methyl ethyl ketone, methyl isobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, ethyl acetate, butyl acetate, isobutyl acetate, isopropyl acetate, ethyl lactate, glycol acetate-monoethyl ether; glycol ethers such as ether, glycol dimethyl ether, glycol monoethyl ether, and dioxane; tar compounds (aromatic hydrocarbons) such as benzene, toluene, xylene, cresol, chlorobenzene, and styrene; chlorinated hydrocarbons such as methylene chloride, ethylene chloride, carbon tetrachloride, chloroform, ethylene chlorohydrin, and dichlorobenzene; N,N-dimethylformaldehyde; and hexane. Two or more of these compounds may be mixed in any desired ratio for use as the solvent.

In carrying out kneading, the ferromagnetic particles and any of the above-described other optional ingredients may be introduced into a kneading machine at one time or successively. For example, there may be employed a method in which the ferromagnetic particles are added to a solvent containing a dispersant and the resulting mixture is stirred for a predetermined period of time to give a magnetic coating composition.

For the kneading and dispersion for obtaining the magnetic coating composition, various kneading machines may be used. Examples thereof include a two-roll mill, a three-roll mill, a ball mill, a pebble mill, a Trommel mill, a sand grinder, a Szegvari attritor, a high-speed impeller, a high-speed stone mill, a high-speed impact mill, a disper, a kneader, a high-speed mixer, a homogenizer, and an ultrasonic dispersing device.

Two or more layers may be formed on a nonmagnetic support simultaneously according to the technique of simultaneously applying a plurality of coating films, as shown in "Paint Flow and Pigment Dispersion" (written by T. C. Patton (1975)) which describes kneading and dispersion techniques.

The application of the magnetic coating composition to form a magnetic layer of the magnetic recording medium of the present invention is generally performed in such an amount as to have a magnetic layer thickness of from about 0.5 to 12 $\mu$m on a dry basis. If the magnetic layer is to be formed by repeated applications of the coating composition, the total thickness of the plural magnetic layers is regulated within the above range.

The dry thickness of the magnetic layer is determined according to the use, shape, standards, etc. of the magnetic recording medium to be produced.

The magnetic coating thus formed on the nonmagnetic support by the method described above is subjected, if desired, to treatment for orienting the ferromagnetic particles according to the method described in U.S. Pat. Nos. 4,324,177, 4,466,164, 4,499,121 and 4,100,326 and then dried to give a magnetic layer. If desired, the thus-obtained recording medium is subjected to a surface-smoothing treatment and cut into desired shape, thereby producing the magnetic recording medium of the present invention according to the method described in U.S. Pat. Nos. 4,324,177, 4,466,164, 4,499,121 and 4,100,326.

In the present invention, further improved surface quality and excellent abrasion resistance can be imparted to the magnetic recording medium by a surface-smoothing treatment of the magnetic layer.

This surface-smoothing treatment can be accomplished, for example, by a smoothing treatment before drying or a calendering treatment after drying.

The magnetic layer in the magnetic recording medium of the present invention preferably has a surface roughness of from 0.005 to 0.020 mm, more preferably from 0.005 to 0.015 mm, in terms of average center line roughness when the cut-off value is 0.25 mm (according to JIS B 0601).

Due to the binder resin employing the combination, in specific proportions, of the polar group-containing vinyl chloride copolymer and the polar group-containing polyurethane resin obtained by the reaction of a polyisocyanate with a polyester polyol that is the product of the reaction of an alicyclic dihydric alcohol and/or an aromatic dihydric alcohol with an alicyclic dicarboxylic acid and/or an aromatic dicarboxylic acid, the magnetic recording medium of the present invention shows such good running durability as to be less apt to suffer damage caused, in particular, by liners and also has excellent electromagnetic characteristics. Therefore, the magnetic recording medium is suited for use in floppy disks.

The novel effects of the present invention will be illustrated in more detail by reference to the following examples and comparative examples, in which all parts are by weight.

EXAMPLE 1

The following composition was kneaded with a kneader for about 1 hour:

| | |
|---|---|
| Ferromagnetic metal particles (Fe content: 99% and Ni content: 1%; specific surface area measured by the BET method: 50 m$^2$/g; coercive force: 1,580 Oe, saturation magnetization: 130 emu/g) | 100 parts |

-continued

| | |
|---|---|
| Polar group-containing vinyl chloride copolymer (MR 110 manufactured by Nippon Zeon Co., Ltd., Japan and containing 0.6 wt % of —SO$_3$Na group and 3 wt % of epoxy group; nonvolatile content: 45 wt %) | 13.5 parts |
| Cr$_2$O$_3$ powder (average particle diameter: 0.5 μm) | 10 parts |
| Carbon black (Ketjen Black EC manufactured by Lion Akzo Co., Ltd., Japan; average particle diameter: 30 mμ) | 10 parts |
| Carbon black (Thermax MT manufactured by Cancarb Company; average particle diameter: 280 mμ) | 3 parts |
| Toluene | 36 parts |
| Methyl ethyl ketone | 36 parts |

To the uniform composition obtained above was added the following composition. The resulting mixture was subjected to dispersing treatment for 2 hours with a sand grinder at 2,000 rpm to obtain a uniform dispersion.

| | |
|---|---|
| Polyurethane resin [alcohol ingredient (70 mol % cyclohexane-1,4-dimethanol and 30 mol % butanediol), acid ingredient (adipic acid), polyisocyanate (diphenylmethane-4,4-diisocyanate in an amount of 15 mol % of the alcohol ingredient); —COOH group content; 1.0 wt % and a number-average molecular weight: 80,000] | 5.1 parts |
| Methyl ethyl ketone | 250 parts |
| Toluene | 250 parts |

The following composition was added to the above-obtained dispersion, and the resulting mixture was homogenized to obtain a magnetic coating composition:

| | |
|---|---|
| Tridecyl stearate (This amount being 38 wt % of the total amount of the binder resin.) | 11 parts |
| Polyisocyanate (Coronate L manufactured by Nippon Polyurethane Industry Co., Ltd.) | 11.4 parts |

This magnetic coating composition was applied on both sides of a nonmagnetic support which was a poly(ethylene terephthalate) film having a width of 30 cm and a thickness of 75 μm, by means of gravure rolls at a thickness of 3.0 μm on a dry basis for each side. The coating composition applied was dried at a temperature of about 100° C. and then calendered at about 40° C., to obtain a magnetic recording medium.

The thus-obtained magnetic recording medium was die-cut into the shape of 3.5-inch floppy disk.

The cut sample was housed in a floppy disk cartridge employing a liner made of nonwoven fabric No. 9246 manufactured by Kendall Company.

EXAMPLE 2

A magnetic recording medium and a floppy disk were obtained under the same conditions as in Example 1 except that the amount of the polar group-containing vinyl chloride copolymer used was 35% by weight, that of the polyurethane resin was 25% by weight, and that of the polyisocyanate was 40% by weight based on the total amount of all these ingredients used for forming a binder resin, the total amount being 30 parts.

EXAMPLE 3

A magnetic recording medium and a floppy disk were obtained under the same conditions as in Example 1 except that the amount of the polar group-containing vinyl chloride copolymer used was 55% by weight, that of the polyurethane resin was 20% by weight, and that of the polyisocyanate was 25% by weight based on the total amount of all these ingredients used for forming a binder resin, the total amount being 30 parts.

EXAMPLE 4

A magnetic recording medium and a floppy disk were obtained under the same conditions as in Example 1 except that the amount of the polar group-containing vinyl chloride copolymer used was 45% by weight, that of the polyurethane resin was 17% by weight, and that of the polyisocyanate was 38% by weight based on the total amount of these ingredients used for forming a binder resin, and the total amount of the polar group-containing vinyl chloride copolymer, polyurethane resin, and polyisocyanate used was changed to 20 parts.

EXAMPLE 5

A magnetic recording medium and a floppy disk were obtained under the same conditions as in Example 1 except that in place of the polyurethane resin employed in Example 1, use was made of a polyurethane resin which was the same as the polyurethane resin in Example 1 except that 1.0% by weight —NH$_2$ groups, in place of the —COOH polar group, had been incorporated into the molecules.

COMPARATIVE EXAMPLE 1

A magnetic recording medium and a floppy disk were obtained under the same conditions as in Example 1 except that the amount of the polar group-containing vinyl chloride copolymer used was 60% by weight, that of the polyurethane resin was 20% by weight, and that of the polyisocyanate was 20% by weight based on the total amount of these ingredients used for forming a binder resin, the total amount being 30 parts.

COMPARATIVE EXAMPLE 2

A magnetic recording medium and a floppy disk were obtained under the same conditions as in Example 1 except that the amount of the polar group-containing vinyl chloride copolymer used was 25% by weight, that of the polyurethane resin was 50% by weight, and that of the polyisocyanate was 25% by weight based on the total amount of these ingredients used for forming a binder resin, the total amount being 30 parts.

COMPARATIVE EXAMPLE 3

A magnetic recording medium and a floppy disk were obtained under the same conditions as in Example 1 except that the amount of the polar group-containing vinyl chloride copolymer used was 45% by weight, that of the polyurethane resin was 17% by weight, and that of the polyisocyanate was 38% by weight based on the total amount of these ingredients used for forming a binder resin, and the total amount of the polar group-containing vinyl chloride copolymer, polyurethane resin, and polyisocyanate used was changed to 13 parts.

COMPARATIVE EXAMPLE 4

A magnetic recording medium and a floppy disk were obtained under the same conditions as in Example 1 except that the amount of the polar group-containing vinyl chloride copolymer used was 45% by weight, that of the polyurethane resin was 17% by weight, and that of the polyisocyanate was 38% by weight based on the total amount of these ingredients used for forming a binder resin, and the total amount of the polar group-containing vinyl chloride copolymer, polyurethane resin, and polyisocyanate used was changed to 40 parts.

The 3.5-inch floppy disk samples obtained above were evaluated for running durability in an atmosphere of 60° C., 30% RH under the following conditions.

Using 3.5-inch floppy disk drive FD-1135D (manufactured by NEC Corporation, Japan), the 3.5-inch floppy disk sample was continuously run at 360 rpm, and the number of passes was counted until the output decreased to 80% of its initial value. If the output of the sample decreased to 45% of the initial value, this sample was regarded as one with dropouts.

The floppy disk samples were further evaluated for initial 2F output using the above-described 3.5-inch floppy disk drive FD-1135D (manufactured by NEC Corporation).

The results obtained are shown in Table 1.

TABLE 1

| Sample | Initial 2F output | Running durability (× 10,000) |
| --- | --- | --- |
| Example 1 | 100% | 2500 (no abnormality) |
| Example 2 | 98% | 2500 (no abnormality) |
| Example 3 | 101% | 2500 (no abnormality) |
| Example 4 | 105% | 2500 (no abnormality) |
| Example 5 | 103% | 2500 (no abnormality) |
| Comparative Example 1 | 101% | 2000 (when dropout occurred) |
| Comparative Example 2 | 93% | 2200 (when running was stopped due to sticking) |
| Comparative Example 3 | 107% | 1500 (when abrasion occurred on magnetic layer) |
| Comparative Example 4 | 89% | 2000 (when running was stopped due to sticking) |

In the durability test, abrasion was observed on the magnetic layer surface of the floppy disk obtained in Comparative Example 1.

COMPARATIVE EXAMPLE 5

A floppy disk sample was prepared under the same conditions as in Example 1 except that the polyurethane resin used contained no —COOH polar group in the molecules thereof.

COMPARATIVE EXAMPLE 6

A floppy disk sample was prepared under the same conditions as in Example 1 except that as the vinyl chloride copolymer, use was made of VAGH (manufactured by Union Carbide; weight-average molecular weight: 50,000) which was a copolymer of vinyl chloride, vinyl acetate, and vinyl alcohol containing no polar group.

The floppy disk samples obtained in Comparative Examples 5 and 6 were evaluated, and the results obtained are shown in Table 2.

TABLE 2

| Sample | Initial 2F output | Running durability (× 10,000) |
| --- | --- | --- |
| Comparative Example 5 | 90% | 2000 (when dropout occurred) |
| Comparative Example 6 | 88% | 2500 (no abnormality) |

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having thereon a magnetic layer comprising ferromagnetic metal particles and binder resins, in which 35 to 55% by weight of said binder resins are a polar group-containing vinyl chloride copolymer and 10 to 25% by weight of said binder resins are a polyurethane resin obtained by the reaction of a polyisocyanate with a polyester polyol that is a product of the reaction of at least one of an alicylic dihydric alcohol and an aromatic dihydric alcohol with at least one of an alicyclic dicarboxylic acid and an aromatic dicarboxylic acid, said polyurethane resin containing a polar group selected from the group consisting of —SO$_3$M, —COOM, —PO$_3$M wherein M is an H, Na, or K atom, and —NH$_2$ in an amount of from 0.03 to 2% by weight, the amount of said binder resins in the magnetic layer being from 15 to 30 parts by weight per 100 parts by weight of said ferromagnetic metal particles.

2. The magnetic recording medium as in claim 1, wherein said magnetic recording medium is a floppy disk.

3. The magnetic recording medium as in claim 1, wherein said magnetic layer consists essentially of the ferromagnetic metal particles and the binder resins.

4. The magnetic recording medium as in claim 1, wherein said binder resins comprises the polar group-containing vinyl chloride copolymer, the polyurethane resin and reacted polyisocyanate.

5. The magnetic recording medium as in claim 1, wherein said alicyclic dihydric alcohol and/or aromatic dihydric alcohol comprises 50 mol % or more of all of the alcohol ingredients of said polyester polyol, and/or said alicyclic dicarboxylic acid and/or aromatic dicarboxylic acid comprises 50 mol % or more of all of the acid ingredients of said polyester polyol.

6. The magnetic recording medium as in claim 1, wherein at least 5 mol % of polyisocyanate is reacted with said polyester polyol, based on the total amount of all alcohol ingredients and all acid ingredients in said polyester polyol.

7. The magnetic recording medium as in claim 1, wherein said polar group of said polar group-containing vinyl chloride copolymer is selected from the group consisting of —SO$_3$M, —OSO$_3$M, —COOM, —PO$_3$M and —PO(OM)$_2$ wherein M is an H, Na or K atom.

8. The magnetic recording medium as in claim 1, wherein said polar group is incorporated in an amount of from 0.01 to 5.0 mol % in the vinyl chloride copolymer.

9. The magnetic recording medium as in claim 8, wherein said vinyl chloride copolymer also contains an epoxy group in an amount of 1.0 to 30 mol %.

10. The magnetic recording medium as in claim 1, wherein the polar-group containing vinyl chloride copolymer is contained in an amount of 40 to 55% by weight based on the amount of the binder resins and the polyurethane resin is contained in an amount of from 15 to 20% by weight based on the amount of the binder resins.

* * * * *